May 9, 1950 J. D. S. DE GUERIN 2,506,663
ENGINE STARTING APPARATUS
Filed March 18, 1947 5 Sheets-Sheet 4

Inventor
J. D. S. De Guerin
By Hesen & Druny Keble Attys

Patented May 9, 1950

2,506,663

UNITED STATES PATENT OFFICE 2,506,663

ENGINE STARTING APPARATUS

Joseph Dudley Shuldham de Guerin, London, England, assignor to Rotax Limited, London, England Application March 18, 1947, Serial No. 735,382
In Great Britain February 12, 1946

Section 1, Public Law 690, August 8, 1946
Patent expires February 12, 1966

5 Claims. (Cl. 123—179)

This invention has for its object to provide an improved apparatus of the turbine type for starting internal combustion engines.

The invention comprises the combination of a turbine, a slidable and rotatable clutch member, reduction gearing interconnecting the said member and the turbine, means dependent on a restricted supply of motive gas for sliding the said member to its operative position, an unbalanced spring loaded valve for controlling the motive gas supplied to the turbine, and means for automatically releasing the valve, the arrangement being such that the clutch member is engaged with a complementary member on the engine after the turbine has attained an appropriate speed.

In the accompanying sheets of explanatory drawings:

Figure 4 is a part sectional plan of a detail.

Figure 1:
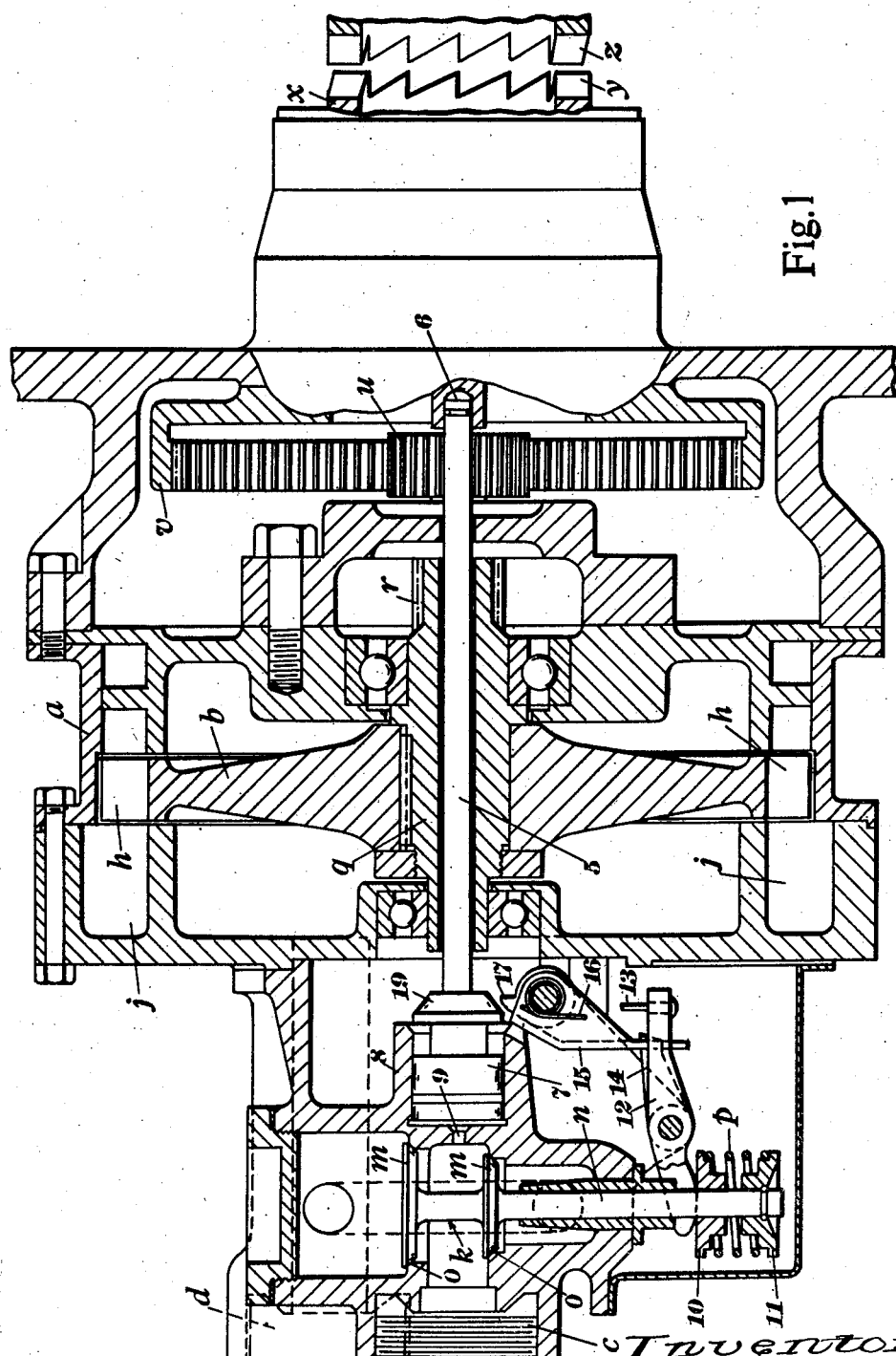
Figure 1 is a part sectional side view, and Figure 2 a sectional plan, of an apparatus constructed in accordance with the invention for starting, for example, an aircraft engine.
Figure 2:
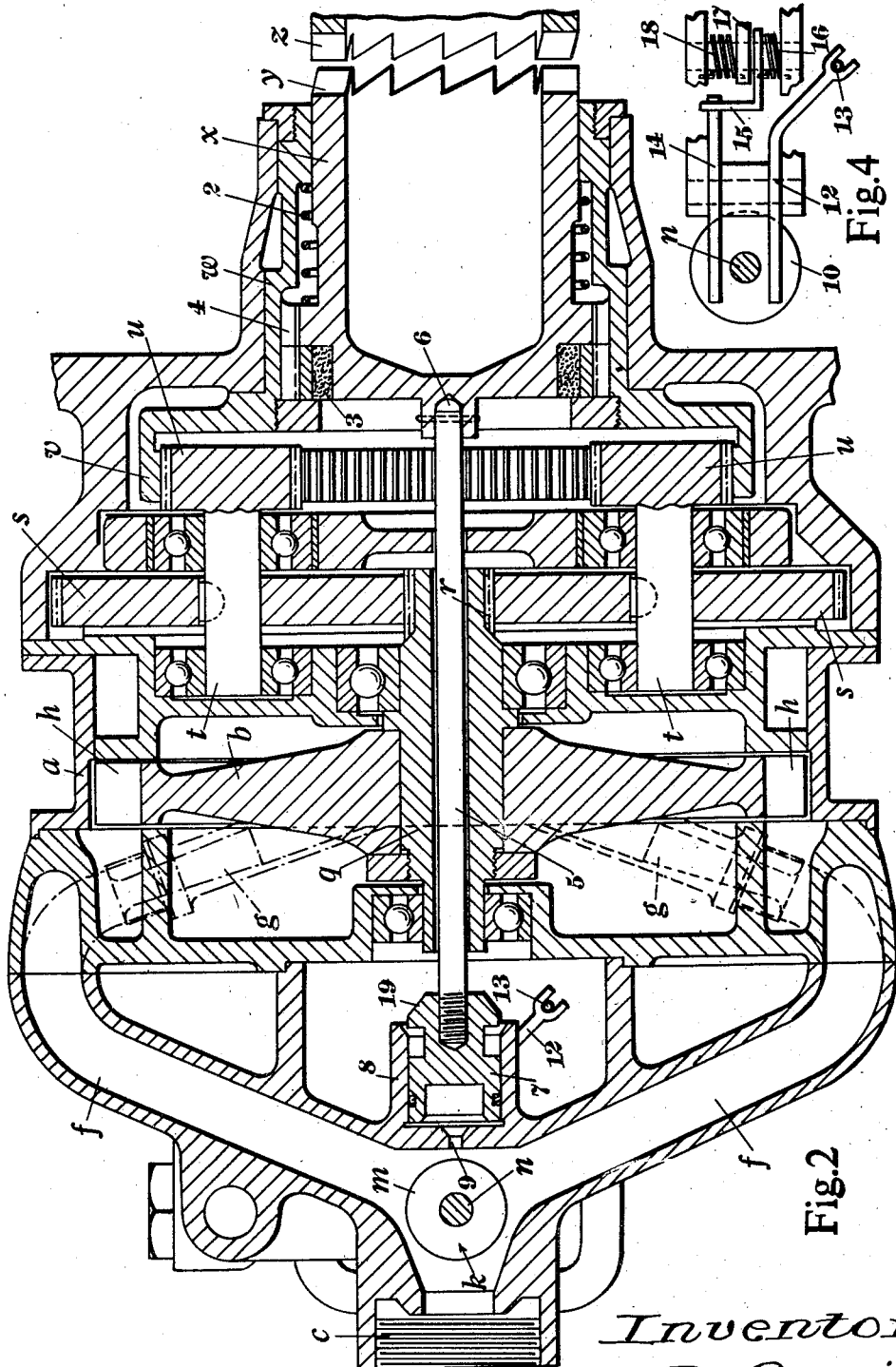
Figure 3:
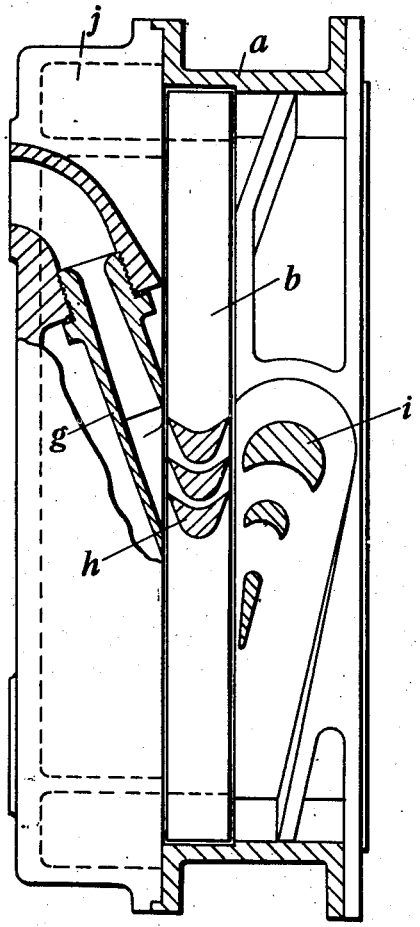
Figure 3 is a part sectional side view of the turbine and associated parts of the apparatus shown in Figures 1 and 2.

In carrying the invention into effect as shown in Figures 1 to 4, I mount in a suitable casing $a$ a single-disc gas turbine $b$. At one end the casing $a$ is provided with an inlet $c$ and an outlet $d$ for the motive-gas required to actuate the turbine $b$. The inlet $c$ is connected by passages $f$ to nozzles $g$ whereby the motive gas is directed on to the peripheral blading $h$ of the turbine $b$. Also I preferably arrange within the casing $a$, fixed blades as $i$ whereby the motive gas, after passing through the turbine, is returned to the latter for the performance of further work before entering an annular passage $j$ in communication with the outlet $d$. Moreover the inlet $c$ and outlet $d$ are interconnectable by a valve comprising a closure member $k$ of the poppet type provided with a pair of heads $m$ of different diameters on an axially movable stem $n$, the heads being adapted to co-operate respectively with a pair of coaxially arranged fixed seatings $o$ corresponding in diameter to the heads, and the stem being provided at its outer end with a loading spring $p$. The arrangement of the valve is such that when the heads $m$ of the closure member $k$ are in contact with the seatings $o$, motive gas must pass between the heads from the inlet $c$ to the passages $f$ leading to the turbine nozzles $g$, but when the heads are lifted off the seatings the motive gas is by-passed directly from the inlet $c$ to the outlet $d$, the control of the closure member being effected as hereinafter described.

The turbine $b$ is mounted on a hollow shaft $q$ carrying a small pinion $r$ which meshes with a relatively large toothed wheel $s$ on a countershaft $t$, (or a plurality of such wheels on countershafts arranged around the turbine shaft), and on the countershaft (or each such shaft) is arranged a pinion $u$ engaging an internally toothed annulus $v$ on a hollow driven shaft $w$. Within the latter, and in spline connection therewith, is arranged a relatively slidable hollow clutch member $x$ having on one end a plurality of ratchet-like teeth $y$ adapted to engage corresponding teeth $z$ on the engine crank shaft. This clutch member $x$ is movable by a spring 2 to its retracted position in which the clutch teeth $y$, $z$ are disengaged, the spring being situated around the clutch member. To minimise shock when the clutch teeth $y$, $z$ are interengaged, a torsionally resilient rubber or like bush 3 may be and preferably is inserted between the slidable clutch member $x$ and the splines 4 by which this member is connected with the hollow driven shaft $w$.

The slidable clutch member $x$ is connected by a rod 5 (preferably having a swivel connection 6 with the said member) to a piston 7 contained in a cylinder 8 located immediately adjacent to the valve above described, the rod extending along the interior of the hollow turbine shaft $q$. The end of the cylinder 8 adjacent to the valve is closed except for a restricted aperture 9 leading to the space between the heads $m$ of the valve closure member $k$, so that when motive fluid is admitted to the inlet $c$, a restricted quantity can enter the cylinder and cause the piston 7 to advance the slidable clutch member $x$ at a relatively slow rate to its operative position while the turbine $b$ is attaining the desired speed.

For the control of the valve closure member $k$, the loading spring $p$ above mentioned is supported at its end by a pair of abutments 10, 11 on the stem $n$, of the closure member, and the abutment 10 is movable relatively to the abutment 11 by a lever 12 for initially compressing the spring, the lever being operable by a Bowden cable 13 or in any other convenient manner. In association with the lever 12 (or with another lever 14 secured thereto) is arranged a catch lever 15 which is loaded by a spring 16, and for actuating the catch lever there is provided a rotatable pawl 17, the latter being loaded by a spring 18, and being adapted to be actuated by a striking piece 19 on the above mentioned piston 7 or the associated rod 5.

The arrangement of the parts above described is such that the heads $m$ of the valve closure member $k$ are held on their seatings $o$ under the action of the loading spring $p$ when the lever 12 acting on the spring abutment 10 is held in its operative position by the catch lever 15, this being the condition shown in the drawings. If it is now required to start the engine, motive gas is admitted to the inlet $c$. In the event of the pressure of the motive gas being excessive it can move the closure member $k$ against the action of the spring $p$ (by reason of the different diameters of the valve heads $m$) and so permit an escape of gas to the outlet $d$. Otherwise the gas passes to the turbine $b$ and sets the latter in motion, the rotation of the turbine being transmitted to the driven shaft $w$ through the reduction gearing $r$—$v$. While the turbine $b$ is gaining speed, the piston 7 under the action of the restricted supply of motive gas to its cylinder 8 advances the slidable clutch member $x$ to its operative position for engaging the clutch teeth $y$, $z$, the engagement being effected after the turbine has attained the desired speed. In this phase of action of the apparatus the striking piece 19 above mentioned passes the pawl 17 idly. After the engine has been started, the interaction of the inclined faces of the clutch teeth $y$, $z$ causes the slidable clutch member $x$ to be pressed back, and in this action the striking piece 19 engages the pawl 17 and causes the latter to trip the catch lever 15. This allows the lever 12 to release the spring $p$, and the closure member $k$ opens under the action of the unbalanced gas pressure acting on the heads $m$ of the said member. The motive gas is thereupon allowed to flow from the inlet $o$ to the outlet $d$, and the turbine $b$ comes to rest. Re-setting of the closure member $k$ is effected by actuation of the lever 12 through the medium of the Bowden cable 13 or otherwise.

Figure 5:
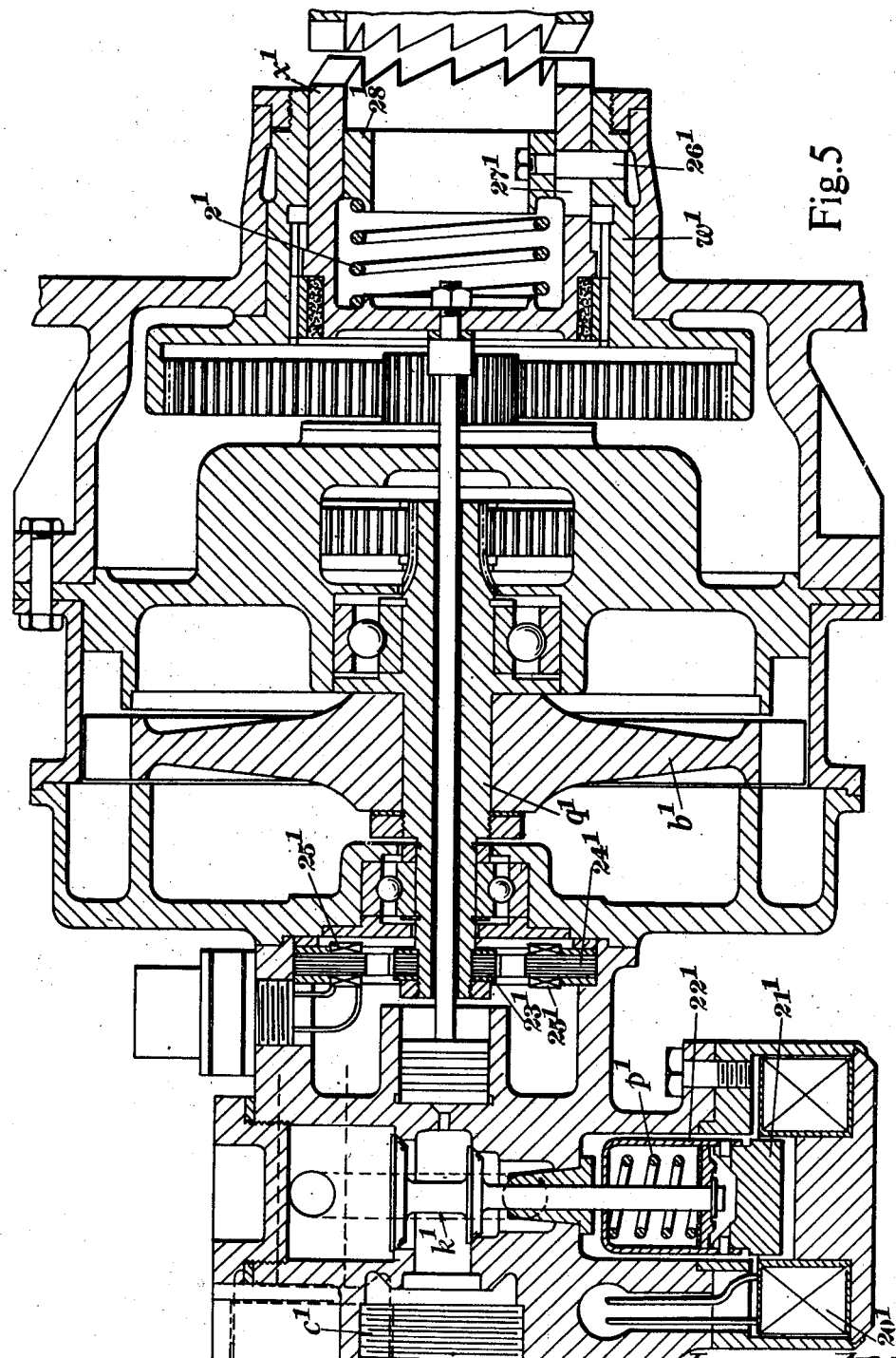
Figures 5 and 6 are respectively similar views to Figures 1 and 2 illustrating a modified form of the invention.
Figure 6:
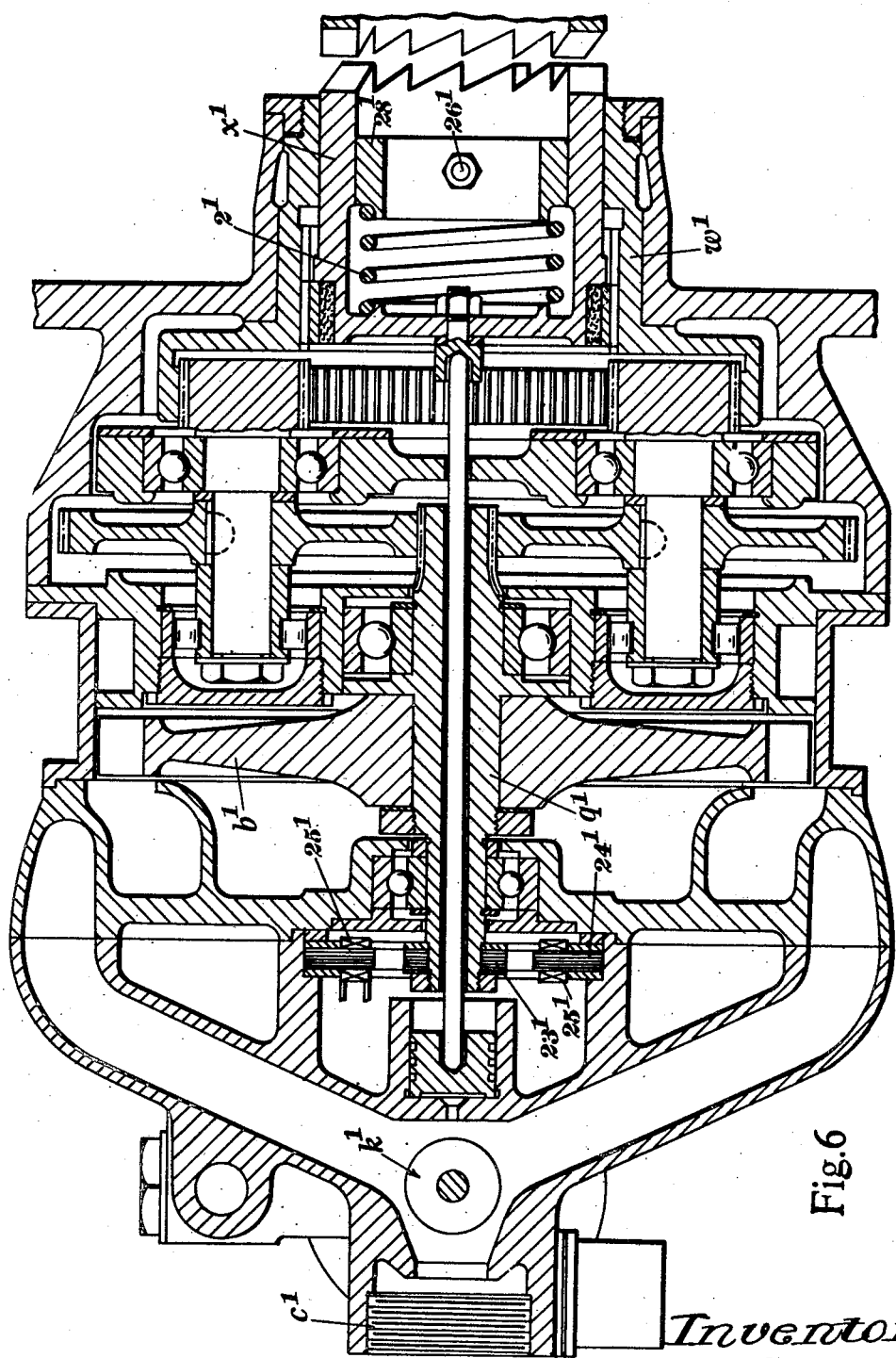

Instead of employing lever mechanism as above described for controlling the loading spring of the valve, I may employ electrically operated means, such as that employed in the modification shown in Figures 5 and 6. In this modification, in which the parts similar or analogous to those above described are indicated by the same reference characters suffixed by 1, I employ for controlling the loading spring $p^1$ of the valve closure member $k^1$, an electromagnet comprising a stationary annular winding $20^1$ and a movable iron core $21^1$, the latter having secured to it a housing $22^1$ which encloses the spring $p^1$, and through which the core can exert pressure on the spring when the winding is energised. Any convenient means are provided for completing the circuit of the winding $20^1$ when motive gas is admitted to the inlet $c^1$. Also this circuit contains a pair of normally closed contacts (not shown) which when opened serve to de-energise the winding $20^1$, and thereby release the loading spring $p^1$ of the valve closure member $k^1$. For opening these contacts I employ a relay (not shown) adapted to be energised by current from a small electric current generator having its rotor $23^1$ mounted on the end of the turbine shaft $q^1$ adjacent to the valve closure member $k^1$, the stator $24^1$ of this generator having windings $25^1$ connected to the relay, and the latter being adapted to open the contacts in response to the voltage developed by the generator when the turbine $b^1$ attains a predetermined speed.

Also, in the example shown in Figures 5 and 6 the spring $2^1$ for retracting the hollow clutch member $x^1$ is situated within this member between a closed end thereof and an abutment ring $28^1$, the latter being secured to the driven shaft $w^1$ by a peg $26^1$ extending through a slot $27^1$ in the clutch member.

In other respects the example shown in Figures 5 and 6 is essentially similar to that shown in Figures 1 to 4.

By this invention an automatic starting apparatus of the kind specified can be provided in a simple and compact form. The invention is not, however, restricted to the examples described, as subordinate details of construction and arrangement may be modified to suit different requirements.

Having thus described my invention what I claim as new and desire to secure by Letters Patent is:—

1. An engine starting apparatus comprising the combination of a gas turbine, an inlet and an outlet through which motive-gas is respectively admitted to and discharged from the turbine, a slidable and rotatable clutch member, reduction gearing interconnecting the said member and the turbine, means for sliding the said member to its operative position in response to the action of a restricted supply of the motive-gas so that the clutch member reaches its operative position after the turbine has attained a predetermined speed, an unbalanced spring loaded valve for controlling the admission of motive-gas to the turbine, and means for automatically releasing the valve.

2. An engine starting apparatus as claimed in claim 1, in which the means for sliding the clutch member comprise in combination a piston, a cylinder in which the piston is slidable, a rod through which sliding movement is transmissible from the piston to the clutch member, and a hollow shaft through which the rod extends and on which the turbine is mounted, the cylinder being provided at one end with a restricted aperture for the admission of motive-gas.

3. An engine starting apparatus as claimed in claim 1, in which the valve is of the poppet type and comprises in combination a closure member in the form of a pair of heads of different diameters on an axially movable stem, a pair of fixed seatings of correspondingly different diameters with which the heads are adapted to cooperate, and a loading spring on the stem, the valve being arranged to control communication between the inlet and outlet through which motive-gas is admitted to and discharged from the turbine, and having associated with it means for controlling the action of the spring.

4. An engine starting apparatus as claimed in claim 1, in which the valve is of the poppet type and comprises in combination a closure member in the form of a pair of heads of different diameters on an axially movable stem, a pair of fixed seatings of correspondingly different diameters with which the heads are adapted to cooperate, and a loading spring on the stem, the valve being arranged to control communication between the inlet and outlet through which motive-gas is admitted to and discharged from the turbine, and having associated with it a movable abutment for one end of the spring, a lever adapted to act on the abutment for compressing the spring, a spring loaded catch for retaining the lever in its operative position, a spring loaded pawl for releasing the catch, and a striking piece movable with the clutch member for actuating the pawl.

5. An engine starting apparatus as claimed in claim 1, in which the valve is of the poppet type and comprises in combination a closure member in the form of a pair of heads of different diameters on an axially movable stem, a pair of fixed seatings of correspondingly different diameters with which the heads are adapted to cooperate, and a loading spring on the stem, the valve being arranged to control communication between the inlet and outlet through which motive-gas is admitted to and discharged from the turbine, and having associated with it a movable abutment for one end of the spring, an electromagnet adapted to act on the abutment for compressing the spring, an electric current generator adapted to be driven by the turbine, and means responsive to the generator current for interrupting the circuit of the electromagnet when the turbine attains a predetermined speed.

JOSEPH DUDLEY SHULDHAM DE GUERIN.

REFERENCES CITED

The following references are of record in the file of this patent:

UNITED STATES PATENTS

| Number | Name | Date |
| --- | --- | --- |
| 2,206,723 | Graham et al. | July 2, 1940 |

FOREIGN PATENTS

| Number | Country | Date |
| --- | --- | --- |
| 375,507 | France | Apr. 23, 1924 |